(12) United States Patent
Qin et al.

(10) Patent No.: US 12,459,574 B2
(45) Date of Patent: Nov. 4, 2025

(54) VEHICLE ROCKER ASSEMBLY

(71) Applicant: Shape Corp., Grand Haven, MI (US)

(72) Inventors: Zehua Qin, Norton Shores, MI (US); Matthew Kuipers, Holland, MI (US)

(73) Assignee: Shape Corp., Grand Haven, MI (US)

( * ) Notice: Subject to any disclaimer, the term of this patent is extended or adjusted under 35 U.S.C. 154(b) by 307 days.

(21) Appl. No.: 18/052,755

(22) Filed: Nov. 4, 2022

(65) Prior Publication Data

US 2023/0147528 A1    May 11, 2023

Related U.S. Application Data

(60) Provisional application No. 63/276,282, filed on Nov. 5, 2021.

(51) Int. Cl.
*B62D 25/02*        (2006.01)

(52) U.S. Cl.
CPC .................................. *B62D 25/025* (2013.01)

(58) Field of Classification Search
CPC .............. B62D 25/025; B60R 19/18; B60R 2019/1806; B60R 2019/1813; B60R 2019/1826; B60R 2019/182
USPC ........................................... 296/209; 293/102
See application file for complete search history.

(56) References Cited

U.S. PATENT DOCUMENTS

| | | | | |
|---|---|---|---|---|
| 5,613,727 A | * | 3/1997 | Yamazaki | B62D 25/02 296/203.03 |
| 11,958,533 B2 | * | 4/2024 | Kuipers | B62D 21/157 |
| 2004/0130166 A1 | * | 7/2004 | Trancart | B60R 19/18 293/102 |
| 2010/0109385 A1 | * | 5/2010 | Yamada | B62D 25/02 296/209 |
| 2012/0086238 A1 | * | 4/2012 | Tan | B62D 25/025 296/209 |
| 2015/0145288 A1 | * | 5/2015 | Kellner | B62D 25/025 296/209 |
| 2018/0009481 A1 | | 1/2018 | Lee et al. | |
| 2018/0370573 A1 | * | 12/2018 | Yang | B62D 21/157 |
| 2020/0114970 A1 | * | 4/2020 | Nusier | B62D 21/157 |
| 2020/0140017 A1 | * | 5/2020 | Schuppert | B62D 25/025 |
| 2021/0261075 A1 | * | 8/2021 | Pendergrass | B62D 25/025 |
| 2021/0309297 A1 | * | 10/2021 | Matecki | B62D 25/025 |
| 2021/0371012 A1 | * | 12/2021 | Limousin | B62D 21/157 |
| 2022/0063728 A1 | * | 3/2022 | Kuipers | B62D 25/025 |

(Continued)

FOREIGN PATENT DOCUMENTS

WO    2020136265 A1    7/2020

OTHER PUBLICATIONS

International Search Report for Application No. PCT/US2022/079287; mailed Mar. 21. 2023; 3 pp.

*Primary Examiner* — Gregory A Blankenship
(74) *Attorney, Agent, or Firm* — Bodman PLC (57) ABSTRACT

A vehicle rocker assembly includes a tubular insert disposed between a sill inner and a sill outer. The tubular insert may include an inboard wall disposed adjacent the sill inner, an outboard wall disposed adjacent the sill outer, an upper wall extending between upper ends of the inboard and outboard walls, a lower wall extending between lower ends of the inboard and outboard walls, and a center wall disposed between the upper and lower walls. The center wall may extend between the inboard and outboard walls with a length less than the upper and lower walls.

19 Claims, 5 Drawing Sheets

(56) References Cited

U.S. PATENT DOCUMENTS

| | | | |
|---|---|---|---|
| 2022/0135136 A1* | 5/2022 | Halonen | B62D 27/065 |
| | | | 296/209 |
| 2022/0212720 A1* | 7/2022 | Oxley | B62D 21/157 |
| 2023/0016200 A1* | 1/2023 | Matsui | B62D 25/025 |
| 2023/0147528 A1* | 5/2023 | Qin | B62D 21/157 |
| | | | 296/209 |
| 2023/0219625 A1* | 7/2023 | Hasenpouth | B62D 21/157 |
| | | | 296/187.12 |
| 2023/0234644 A1* | 7/2023 | Limousin | B62D 25/025 |
| | | | 296/187.12 |
| 2023/0347986 A1* | 11/2023 | Kuipers | B62D 21/157 |
| 2024/0083513 A1* | 3/2024 | Kuipers | B62D 21/157 |
| 2024/0140533 A1* | 5/2024 | Song | B62D 25/025 |
| 2024/0182116 A1* | 6/2024 | Lee | B62D 29/008 |
| 2024/0239411 A1* | 7/2024 | Carl | B62D 25/2036 |
| 2024/0286684 A1* | 8/2024 | Kim | B62D 25/025 |
| 2024/0294210 A1* | 9/2024 | Lee | B62D 27/026 |
| 2024/0308593 A1* | 9/2024 | Kuipers | B62D 25/025 |
| 2024/0326916 A1* | 10/2024 | Lee | B62D 27/023 |

\* cited by examiner

VEHICLE ROCKER ASSEMBLY

CROSS-REFERENCE TO RELATED APPLICATION

This application claims priority under 35 U.S.C § 119(e) to U.S. Provisional Patent Application No. 63/276,282, filed Nov. 5, 2021, the disclosure of this prior application is considered part of this application and is hereby incorporated by reference in its entirety.

TECHNICAL FIELD

The present disclosure relates to sill assemblies and more specifically to tubular inserts for vehicle rocker assemblies for vehicle body structures.

BACKGROUND

Vehicle frames and body structures are designed to support the vehicle and undergo and absorb certain levels of impact forces, such as to prevent distances of inboard intrusion into the vehicle in accordance with insurance requirements and other regulatory and legal requirements. Side impacts to a vehicle are commonly tested with side pole impact testing, which direct significant side impact forces to the vehicle. Vehicle frames primarily absorb these side impacts at rocker sections that run longitudinally between the front and rear wheels along the lower outboard portions of the vehicle frame.

With the incorporation of battery trays in electric and hybrid electric vehicles in the lateral inboard area between opposing rocker sections, it is desirable for the side impact forces to be directed away from the battery tray and towards a vehicle floor cross member. For example, it is generally known to increase stiffness of a vehicle sill assembly such as by adding a tubular insert within the vehicle sill assembly.

SUMMARY

The present disclosure provides a vehicle rocker assembly. Examples of the vehicle rocker assembly may include a sill inner comprising a sill wall portion, an upper wall portion, a lower wall portion, an upper flange portion, and a lower flange portion. The vehicle rocker assembly may also include a sill outer comprising a sill wall portion, an upper wall portion, a lower wall portion, an upper flange portion, and a lower flange portion. In some examples, the upper flange portion of the sill inner is coupled with the upper flange portion of the sill outer, and the lower flange portion of the sill inner is coupled with the lower flange portion of the sill outer to enclose an elongated hollow interior of the vehicle rocker assembly. The vehicle rocker assembly may also include a tubular insert disposed within the elongated hollow interior. The tubular insert may include an inboard wall disposed adjacent the sill inner, an outboard wall disposed adjacent the sill outer, an upper wall extending between upper ends of the inboard and outboard walls, a lower wall extending between lower ends of the inboard and outboard walls, and a center wall disposed between the upper and lower walls. The center wall may extend between the inboard and outboard walls with a length less than the upper and lower walls.

Implementations of the disclosure may include one or more of the following optional features. In some examples, the outboard wall includes a channel that protrudes inboard into the tubular insert. In some examples, the channel comprises a V-shape.

Additionally, in some examples the outboard wall includes a first leg and a second leg that protrude inboard from the sill outer to interconnect with the center wall. Moreover, in some examples, upper and lower walls are substantially parallel, and wherein the center wall is angled relative to the upper and lower walls.

The details of one or more examples of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

Like reference numerals indicate like parts throughout the drawings.

DETAILED DESCRIPTION

Figure 1:
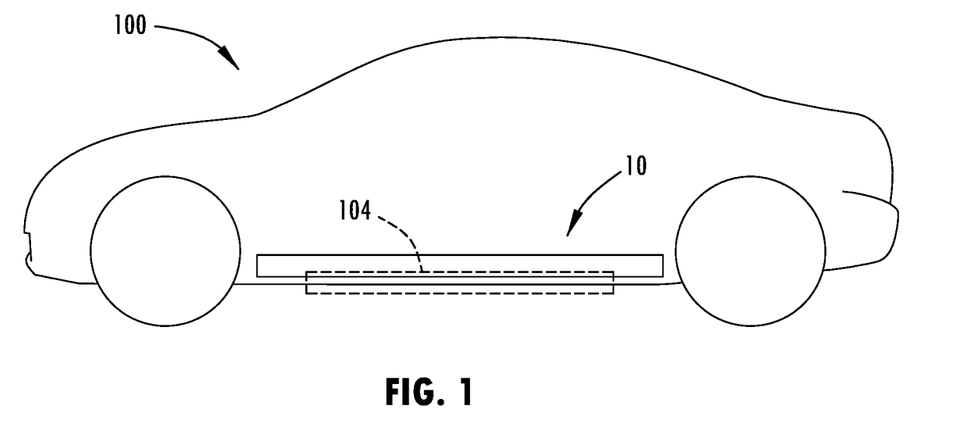
FIG. 1 is a side elevation view of a vehicle showing a vehicle rocker assembly including a tubular insert.
Figure 2:
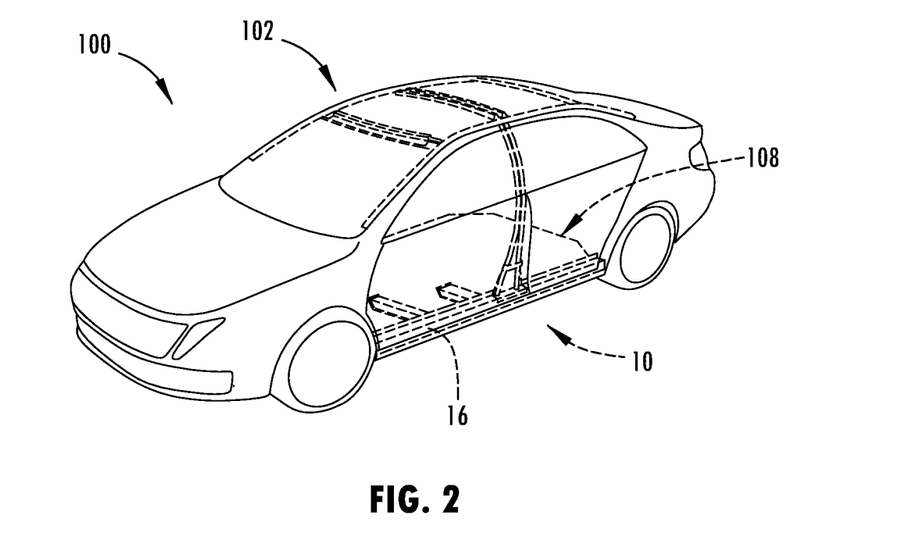
FIG. 2 is an upper perspective view of a vehicle showing the rocker assembly including a tubular insert and other structural components.

Referring now to the drawings and the illustrative embodiments depicted therein, a vehicle rocker assembly 10 is provided for a vehicle 100, such as for a body structure or frame 101, such as shown in FIGS. 1 and 2. The vehicle frame 102 and associated components may have various designs and configurations, such as for different styles and types of vehicles. As shown for example FIGS. 1 and 2, the vehicle frame 102 may include a rocker assembly 10, a B-pillar, a floor cross-member, and a hinge pillar, among various other vehicle frame components. Also, as shown in FIG. 1, the vehicle may be partially operated by a propulsion system that uses a battery, such as battery modules that are supported in a battery tray 104 generally located between the axles and near the floor of the vehicle to distribute the battery weight and establish a low center of gravity for the vehicle. Accordingly, the vehicle rocker assembly and associated insert may also or alternatively be implemented as a battery tray frame component.

The vehicle rocker assembly 10 may be used as a structural frame component or a battery tray component, either of which are designed to undergo various impact forces and designed to support and sustain different loading conditions. While designing the vehicle to meet the required impact and loading requirements, the outer dimensions of the vehicle component may be reduced and the overall weight of the associated vehicle component may be reduced by providing a tubular reinforcement insert at the desired section of an interior of the vehicle component. In some examples, the tubular insert may span a partial section or the entire length of the vehicle rocker assembly or battery tray. The rocker assembly 10 shown in FIG. 1 is disposed alongside an outer section of a battery tray 104 that is attached to the vehicle rocker assembly 10.

Figure 3:
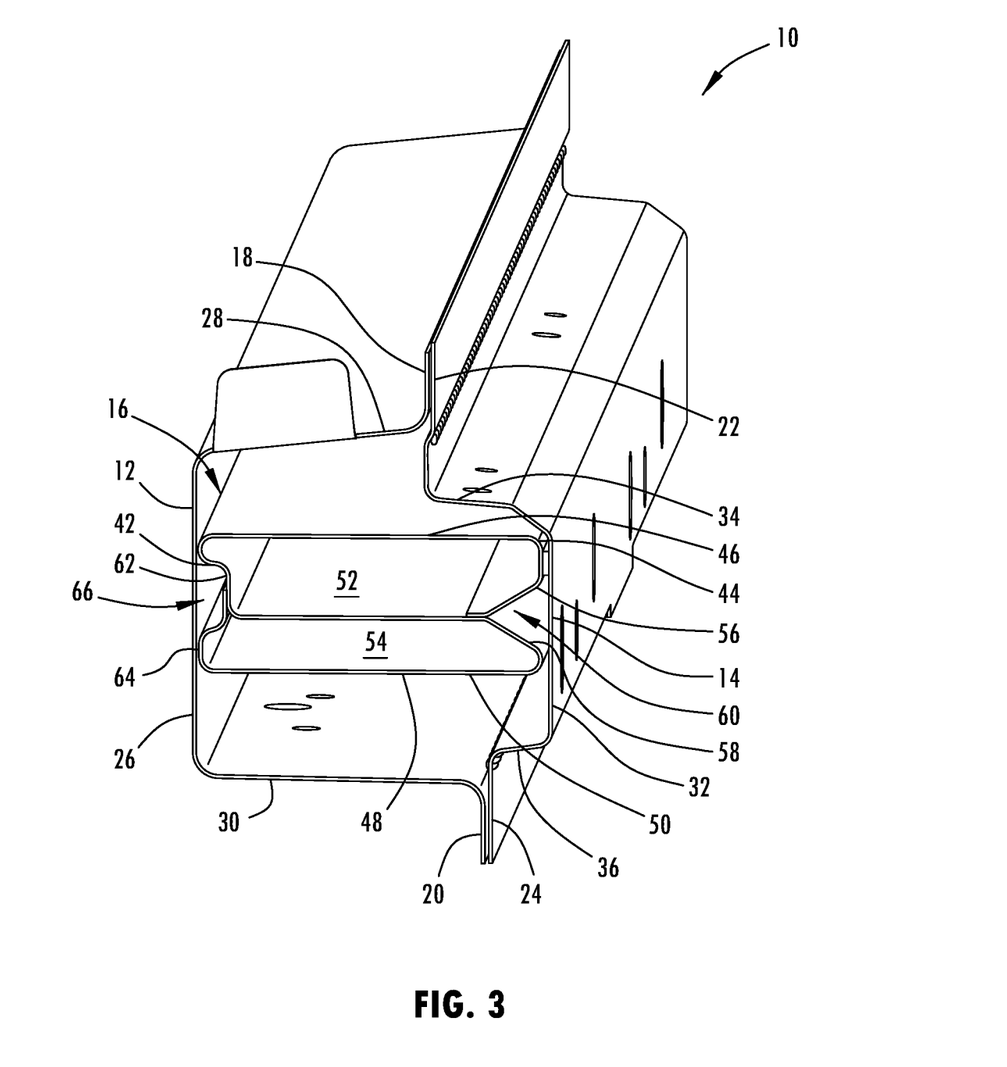
FIG. 3 is a cross-sectional view of an example of the vehicle rocker assembly including the tubular insert.

The vehicle rocker assembly 10 includes a sill panel or panels, such as a sill inner panel 12 and sill outer panel 14 that attach together around an interior area 16, where the terms "inner" and "outer" are made in reference to inboard or inward facing and outboard or outward facing directions on the vehicle, such oriented in FIGS. 1 and 2. As shown in FIG. 3, the example of the vehicle rocker assembly 10 is provided with a reinforcement insert disposed in the interior area 16 to form a multi-tubular rocker structure.

When designing the vehicle rocker assembly 10 with a reinforcement or tubular insert disclosed herein, the outer dimensions of the vehicle rocker assembly may be reduced and the overall weight of the vehicle rocker assembly 10 may be reduced while meeting the required impact and loading conditions. The tubular insert may span a partial section of the vehicle rocker assembly or the entire length of the rocker assembly, such as to extend beyond the rocker assembly into and to also reinforce an adjacent component. The tubular insert disclosed herein may comprise the entire vehicle component or may be joined to additional reinforcements or parts of the vehicle component, such as at desired sections of the vehicle component. Further, in some examples the rocker assembly may be embodied as a subassembly or as part of a corresponding vehicle component, such as a structural component or a battery tray component and as such may be designed to undergo various impact forces and to support and sustain different loading conditions.

Moreover, the tubular insert disclosed herein may be formed with one or more pieces of sheet material, such as by roll forming a metal sheet, to provide the structure with a relatively high strength (for shear and axial loading) and low weight in comparison to common rocker panels, such as to allow the still panels of the corresponding vehicle component (if provided) to use less material, occupy a smaller packaging space, and have greater flexibility in the outer shape design. The cross-sectional shape of different examples of the vehicle component and tubular insert may include various shapes and thicknesses for the desired application of the vehicle component.

Unless specified to the contrary, it is generally understood that additional implementations of the rocker assembly may have an opposite orientation from the examples shown and described, such as where the sill panels identified as an inner panel may be used as the outer panel and the sill panels identified as an outer panel may be used as the inner panel. The cross-sectional shape of the inner and outer panels may vary along the rocker, such as, for example, by flaring outward at the ends.

Referring now to the vehicle rocker assembly 10 shown in FIG. 3, a first sill panel 12 and a second sill panel 14 are attached together to surround a hollow interior space 16 between the sill panels 12, 14. The vehicle rocker assembly 10 shown in FIG. 3 is embodied as a vehicle rocker component. Accordingly, the first sill panel 12 may be referred to as a sill inner panel of a rocker component. The first sill panel 12 has an upper flange 18 and a lower flange 20 that extend along respective upper and lower edges of the inner panel. The first sill panel 12 protrudes inboard from the upper and lower flanges 18, 20 to form outward facing concave structures. The second sill panel 14, which may be referred to as a sill outer panel of a rocker component, has a C-shaped cross section with flanges 22, 24, which may similarly be referred to as an upper flange 22 and a lower flange 24. The upper flanges 18, 22 and the lower flanges 20, 24 of the inner and outer sill panels 12, 14 are attached together, such as via welding, with the concave structures facing each other. The upper and lower flanges 18, 20, 22, 24 of each of the sill panels 12, 14 shown in FIG. 3 extend longitudinally, continuously along the edges of the rocker component; however, it is contemplated that the flanges may be trimmed away in select areas to facilitate frame attachment or to reduce weight.

As further shown in FIG. 3, the inner and outer sill panels 12, 14 are joined together to define a hollow interior space 16 between the sill panels 12, 14. The upper and lower flanges 18, 20, 22, 24 are substantially planar and oriented in a generally vertical configuration, such as to mate in generally continuous contact along the length of the component. The upper and lower flanges 18, 20, 22, 24 may be joined together via welding, and preferably spot welding, although it is conceivable that alternative welding methods or joining means may be used in addition or in the alternative to spot welding in different implementations of a rocker component, such as adhesive or fasteners or the like.

The first sill panel 12, or inner panel of the vehicle rocker assembly 10, has an inner wall 26 that is substantially planar. The inner wall 26 integrally interconnects with a corner transition to an upper wall 28 and a lower wall 30 at the respective upper and lower ends. The corner transitions are approximately 90 degrees between the inner wall 26 and the upper and lower walls 28, 30. Also, the corner transitions are defined by the longitudinal bends to a sheet material that forms the first sill panel 12, such as a metal sheet (e.g., an advanced high strength steel sheet or aluminum sheet). Similarly, the upper and lower walls 28, 30 each have a corner transition of approximately 90 degrees to the upper flange 18 and the lower flange 20, respectively. The corner transitions are also defined by longitudinal bends in the sheet material of the first sill panel 12, such as formed by a roll form process. As also shown in FIG. 3, the upper and lower flanges 18, 20 are substantially planar and oriented in parallel alignment with the planar extent of the inner wall 26. The upper and lower walls 28, 30 of the first sill panel 12 are also substantially planar and, as shown in FIG. 3, slightly angled from each other, although in additional examples they may be are substantially parallel to each other. The corner transitions may also have an angular transition greater or less than shown in FIG. 3, such as approximately between 40 and 120 degrees, between 70 and 100 degrees, between 80 and 95 degrees, or between 82 and 92 degrees.

As also shown in FIG. 3, the second sill panel 14 or outer panel of the vehicle rocker assembly 10 has an outer wall 32 that is substantially planar and integrally interconnects with an upper wall 34 and a lower wall 36 at its respective upper and lower ends. The corner transitions of approximately 80 degrees between the outer wall 32 and the upper and lower walls 34, 36 are defined by longitudinal bends to a sheet material that forms the second sill panel 14. The sheet material may be the same or different from the first sill panel 12 and may include a metal sheet, such as an advanced high strength steel sheet or aluminum sheet. Similarly, the upper wall 34 also has a corner transition to the upper flange 22 and the lower wall 36 has a corner transition to the lower flange 24, which are each also defined by longitudinal bends in the sheet material of the second sill panel 14. Again, the corner transitions between the upper and lower walls 34, 36 and the upper and lower flanges 22, 24 and the outer wall 32 may have an angular transition greater or less than shown in FIG. 4, such as approximately between 40 and 120 degrees, between 70 and 100 degrees, between 80 and 95 degrees, or between 82 and 92 degrees.

As shown in FIG. 3, the upper and lower flanges 22, 24 are substantially planar and oriented in parallel alignment with the planar extent of the outer wall 32. The upper and lower walls 34, 36 of the second sill panel 14 are also substantially planar, but are slightly angled from being orthogonal to the outer wall 32 and flanges 22, 24. With the flanges 18, 20, 22, 24 of the panels 12, 14 attached together, the walls thereof define a substantially hexagonal cross-sectional shape; however, it is appreciated that additional examples of the tubular insert may have various alternative cross-sectional shapes (e.g., a substantially rectangular shape) and different wall configurations for the corresponding vehicle design (e.g., portions of the inner or outer walls that are not vertically oriented). It is also contemplated that in other examples the outer sill and the inner sill may each include a different configuration including but not limited to the outer sill having an inward or outward protruding stiffening rib portion configured to provide additional stiffness and side impact support.

Figure 4:
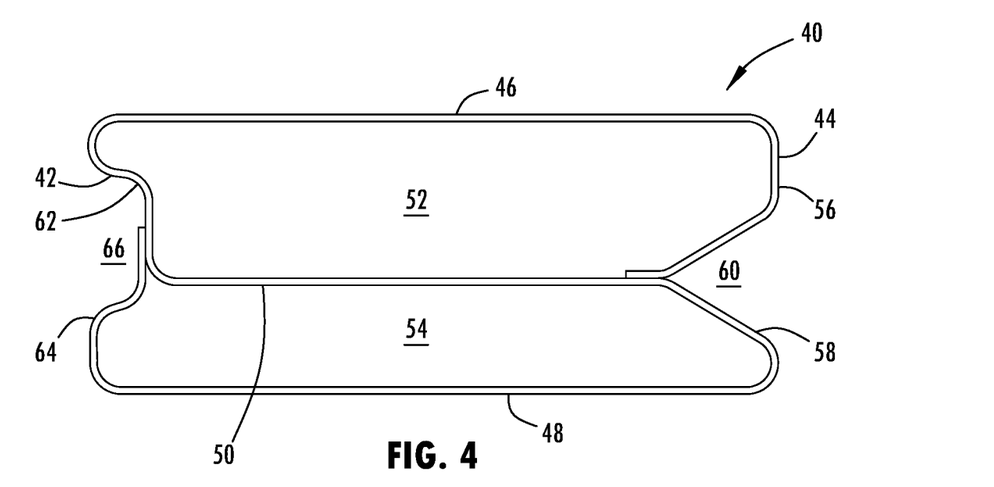
FIG. 4 is a cross-sectional view of the example of the tubular insert shown in FIG. 3.

As further shown in FIGS. 3 and 4, the vehicle rocker assembly 10 includes a tubular insert 40 disposed within the elongated hollow interior 16. The tubular insert 40 includes an inboard wall 42 disposed adjacent the sill inner 12, an outboard wall 44 disposed adjacent the sill outer 14, an upper wall 46 extending between upper ends of the inboard and outboard walls 42, 44, and a lower wall 48 extending between lower ends of the inboard and outboard walls 42, 44. The tubular insert 40 also includes a center wall 50 disposed between the upper and lower walls 46, 48 and extending between the inboard and outboard walls 42, 44. In some examples, the center wall 50 has a length less than a length one or both of the upper wall 46 and the lower wall 48. The upper wall 46, the inboard wall 42, the outboard wall 44, and the center wall 50 define an upper hollow interior 52 and the lower wall 48, the inboard wall 42, the outboard wall 44, and the center wall 50 define a lower hollow interior 54 creating a multi-hollow tubular structure.

Moreover, in the example shown in FIGS. 3 and 4, the upper and lower walls 46, 48 generally extend horizontally and substantially parallel to one another. However, it is also contemplated that the upper and lower walls 46, 48 may extend at a different angle such as an angle between 0-30 degrees or 0-15 degrees. Moreover, in some examples, the upper and lower walls 46, 48 may extend at different angles from one another such that the upper and lower walls 46, 48 do not extend parallel to one another. Additionally, in some examples, one or more of the upper or lower walls 46, 48 may include recessed portions or channels or other structural features.

Referring still to the example shown in FIGS. 3 and 4, the upper and lower walls 46, 48 extend between the inboard and outboard walls 42, 44. In one example, the outboard wall 44 is coupled to the outer wall 32 of the second sill member 14. In the example shown, the outboard wall 44 includes a first leg 56 extending from the upper wall 46 and a second leg 58 extending from the lower wall 48. The first leg 56 and the second leg 58 protrude inward to interconnect with the center wall 50. The coupling between the first leg 56 and the second leg 58 and/or the center wall 50 may be a welded coupling, or the first leg 56, the second leg 58, and/or the center wall 50 may be coupled by another method as desired. In the example shown, the first leg 56 is coupled to the center wall 50 which extends from the second leg 58 such that a separate coupling between the second legs 58 and the center wall is not needed. However, it is also contemplated that the first leg 56, the second leg 58, and/or the center wall 50 may be integrally formed such that no additional coupling techniques are used, such as in example where the tubular insert is an aluminum extrusion.

Moreover, as shown in FIGS. 3 and 4, the protruding inward first and second legs 56, 58 may define a channel 60 that protrudes inboard into the tubular insert 40. The channel 60 comprises a V-shape. The channel 60 may have a length that is the same as the length of the first and second legs 56, 58 or may only partially extend the length of the first and/or second legs 56, 58. Moreover, the channel may be of another shape such as U-shape or variation thereof. Additionally, in the example shown, the first leg 56 of the outboard wall 44 extends substantially vertically from the upper wall 46 before protruding inward. The angle of protrusion inward may be a sharp approximately 45 degrees as shown in FIGS. 3 and 4 or may be another angle such as between 25-90 degrees. It is also contemplated that the angle of protrusion may be more curved than sharp, as desired. Additionally, the angle between the upper wall 46 and the first leg 56 of the outboard wall 44 may be another angle than substantially vertical such as between 25-120 degrees or any may form a curve or other shape as desired. Referring still to the example shown in FIGS. 3 and 4, the second leg 58 may extend from the lower wall 48 at a curved angle of approximately 45 degrees. However, similar to the first leg 56 as described above, the second leg 58 may extend in a variety of ways from the lower wall 48 including but not limited to substantially vertically, and/or at a sharp of curved angle of between 20-120 degrees.

As shown in the example illustrated in FIGS. 3 and 4, the inboard wall 42 extends between the upper and lower wall 46, 48. In one example, the inboard wall 42 is coupled to the outer wall 26 of the first sill member 12. The coupling may be by welding or other known coupling techniques. The inboard wall 42 includes a first leg 62 extending from the upper wall 46 and a second leg 64 extending from the lower wall 48. The first leg 62 and the second leg 64 protrude inward to interconnect with the center wall 50. The coupling between the first leg 62 and the second leg 64 and/or the center wall 50 may be a welded coupling, or the first leg 62, the second leg 64, and/or the center wall 50 may be coupled by another method as desired. In the example shown, the first and second legs 62, 64 are coupled to one another and the center wall 50 extends therefrom such that separate coupling to the center wall 50 is not needed. However, it is also contemplated that the first leg 62, the second leg 64, and/or the center wall 50 may be integrally formed such that no additional coupling techniques are used.

Furthermore, as shown in FIGS. 3 and 4, the protruding inward first and second legs 62, 64 may define a channel 66 that protrudes outboard into the tubular insert 40. In the example shown, the channel 66 comprises a U-shape. The channel 66 may have a length that is the same as the length of the first and second legs 56, 62, 58, 64 or may only partially extend the length of the first and/or second legs 58, 64. Moreover, the channel 66 may be of another shape such as a V-shape. Referring still to the example shown in FIGS. 3 and 4, the first leg 62 may extend from the upper wall 46 at a curved angle of approximately 45 degrees. However, the second leg 64 may extend in a variety of ways from the lower wall 48 including but not limited to substantially vertically, and/or at a sharp of curved angle of between 20-120 degrees. Additionally, in the example shown, the second leg 64 of the inboard wall 42 extends substantially vertically from the upper wall 46 before protruding inward. The angle of protrusion inward may be approximately 45 degrees as shown in FIGS. 3 and 4 or may be another angle such as between 25-90 degrees. Additionally, the angle between the upper wall 46 and the first leg 62 of the inboard wall 42 may be another angle than substantially vertical such as between 25-120 degrees or any may form a curve or other shape as desired. In some examples, the first leg 62 and the second leg 64 are similar shapes and lengths to one another, however, various other shapes have been contemplated and some will be described with respect to various other examples below.

Referring still to the example shown in FIGS. 3 and 4, the center wall 50 extends between the inboard wall 42 and the outboard wall 44. The center wall 50 has a length that is shorter than the length of one or more of the upper wall 46 and/or the lower wall 48. In the example shown in FIGS. 3 and 4, the length of the center wall 50 is defined between the connections with the legs at the inboard and outboard walls 42, 44 and is less than the length of both the upper wall 46 and the lower wall 48. Having the center wall 50 with a length less than one or more of the upper wall 46 and/or the lower wall 48, provides more stabilization to the center wall 50 and also allows the center wall 50 to absorb more energy or resist higher loads prior to failing or buckling.

As additionally shown in FIGS. 3 and 4, the center wall 50 is substantially parallel with both the upper wall 46 and the lower wall 48. However, other variations have been contemplated including but not limited to the center wall 50 extending parallel to only one of the upper wall 46 or the lower wall 48 or the center wall 50 having a different angle of extension from both the upper wall 46 and the lower wall 48 such that the center wall 50 is not parallel with either the upper wall 46 or the lower wall 48. Having the center wall 50 disposed between the upper wall 46 and the lower wall 48 also provides for three load carrying walls in one direction allowing the tubular insert 40 to absorb more energy or resist higher loads before failing or buckling.

Figure 5:
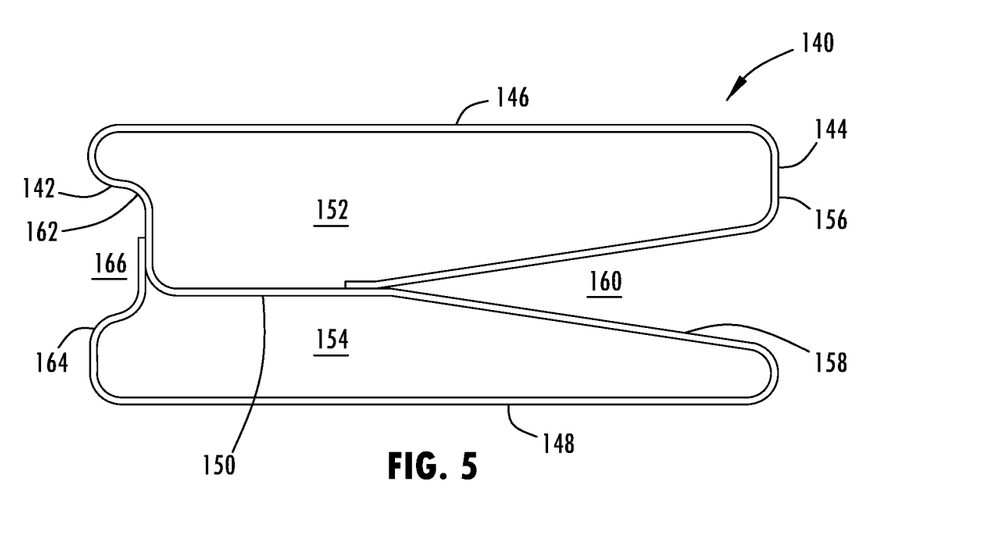
FIG. 5 is a cross-sectional view of another example of the tubular insert.

Referring now to the example shown in FIG. 5, the tubular insert 140 is similar to the tubular insert 140 as described above with respect to FIGS. 3 and 4, including but not limited to the tubular insert 140 including an inboard wall 142 disposed adjacent the sill inner, an outboard wall 144 disposed adjacent the sill outer, an upper wall 146 extending between upper ends of the inboard and outboard walls 142, 144 and a lower wall 148 extending between lower ends of the inboard and outboard walls 142, 144. The tubular insert 140 also includes the center wall 150 disposed between the upper and lower walls 146, 148 and extending between the inboard and outboard walls 142, 144 with the center wall 150 having a length less than a length of one or more of the upper and/or lower wall 146, 148. However, in the example shown in FIG. 5, the first and second legs 156, 162, 158, 164 of the outboard walls 142, 144 protruded inward at a smaller angle than what is illustrated in FIGS. 3 and 4 such that the V-shaped channel is deeper and the center wall 150 is shortened ever further.

Figure 6:
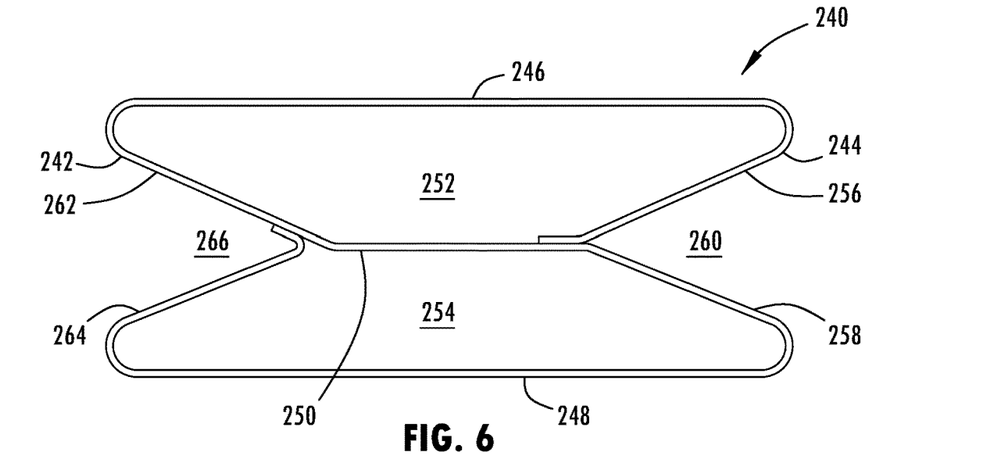
FIG. 6 is a cross-sectional view of another example of the tubular insert.

Referring now to the example shown in FIG. 6, the tubular insert 240 is similar to the tubular insert 240 as described above with respect to FIGS. 3 and 4, including but not limited to the tubular insert 240 including an inboard wall 242 disposed adjacent the sill inner, an outboard wall 244 disposed adjacent the sill outer, an upper wall 246 extending between upper ends of the inboard and outboard walls 242, 244, and a lower wall 248 extending between lower ends of the inboard and outboard walls 242, 244. The tubular insert 240 also includes the center wall 250 disposed between the upper and lower walls 246, 248 and extending between the inboard and outboard walls 242, 244 with the center wall 250 having a length less than a length of one or more of the upper and/or lower wall 246, 248. However, in the example shown in FIG. 6, each of the first legs 256, 262 and second legs 258, 264 of the inboard wall 242 and outboard wall 244 extend at a substantially curved angle of approximately 45 degrees from the upper wall 246 and the lower wall 248 and protrude towards one another at the same or similar angle such that the center wall 250 is disposed centrally between the first legs 256, 262 and second legs 258, 264 of the inboard wall 242 and the outboard wall 244 providing a substantially symmetrical tubular structure. As also shown in the example shown in FIG. 6, both the channel formed by the first and second legs 256, 262, 258, 264 of the inboard wall 242 and the first and second legs 256, 262, 258, 264 of the outboard wall 244 may form a V-shaped channel. It is also contemplated that the curved angles may be sharp angles and/or have another angle from the upper wall 246 and lower wall 248 including but not limited to 20-120 degrees. Moreover, it is also contemplated that the first and second legs 256, 262, 258, 264 on one of the inboard side or the outboard side may have a longer length such that the tubular insert 240 is not substantially symmetrical. It is also contemplated that one of the inboard wall 242 or outward wall may extends towards the center wall 250 at a different angle than the other such that the corresponding channels formed are different sizes.

Figure 7:
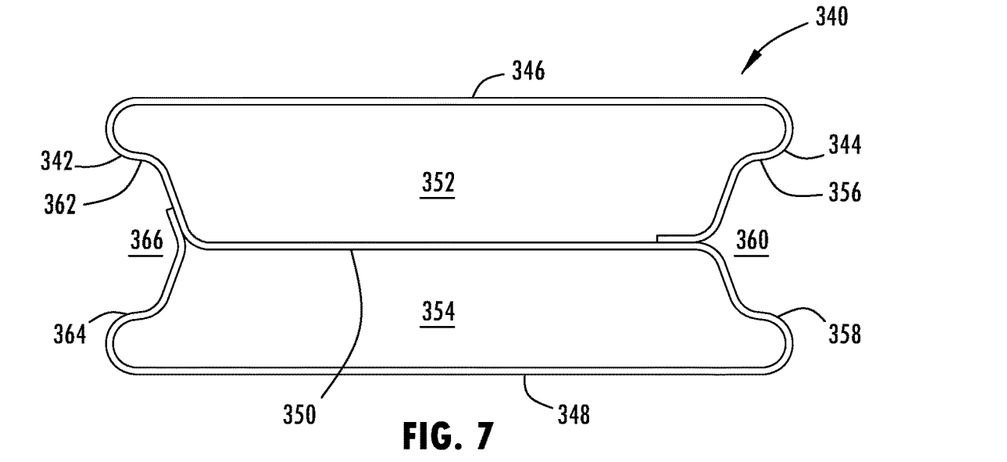
FIG. 7 is a cross-sectional view of another example of the tubular insert.

Referring now to the example shown in FIG. 7, the tubular insert 340 is similar to the tubular insert 340 as described above with respect to FIGS. 3 and 4, including but not limited to the tubular insert 340 including an inboard wall 342 disposed adjacent the sill inner, an outboard wall 344 disposed adjacent the sill outer, an upper wall 346 extending between upper ends of the inboard and outboard walls 342, 344, and a lower wall 348 extending between lower ends of the inboard and outboard walls 342, 344. The tubular insert 340 also includes the center wall 350 disposed between the upper and lower walls 346, 348 and extending between the inboard and outboard walls 342, 344 with the center wall 350 having a length less than a length of one or more of the upper and/or lower wall 346, 348. However, in the example shown in FIG. 7, each of the first legs 356, 362 and second legs 358, 364 of the inboard wall 342 and outboard wall 344 extend at a substantially curved angle of approximately 60 degrees from the upper wall 346 and the lower wall 348 and then protrude towards one another at a more vertical angle while the center wall 350 is disposed centrally between the first legs 356, 362 and second legs 358, 364 of the inboard wall 342 and the outboard wall 344 providing a substantially symmetrical tubular structure. As also shown in the example shown in FIG. 7, the more vertical nature of the first and second legs 356, 362, 358, 364 of the both the inboard wall 342 and the outboard wall 344 form a generally U-shaped channel. It is also contemplated that the curved angles may be sharp angles and/or have another angle from the upper wall 346 and lower wall 348 including but not limited to 20-120 degrees. Moreover, it is also contemplated that the first and second legs 356, 362, 358, 364 on one of the inboard side or the outboard side may have a longer length such that the tubular insert 340 is not substantially symmetrical. It is also contemplated that one of the inboard wall 342 or outboard wall 344 may extends towards the center wall 350 at a different angle than the other such that the corresponding channels formed are different sizes.

Figure 8:
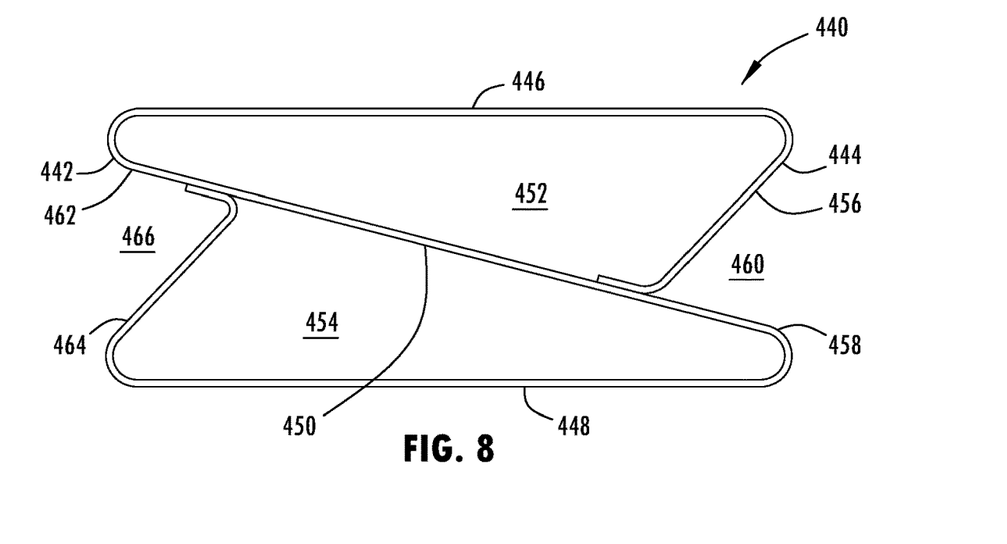
FIG. 8 is a cross-sectional view of another example of the tubular insert.

Referring now to the example shown in FIG. 8, the tubular insert 440 is similar to the tubular insert 440 as described above with respect to FIGS. 3 and 4, including but not limited to the tubular insert 440 including an inboard wall 442 disposed adjacent the sill inner, an outboard wall 444 disposed adjacent the sill outer, an upper wall 446 extending between upper ends of the inboard and outboard walls 442, 444, and a lower wall 448 extending between lower ends of the inboard and outboard walls 442, 444. The tubular insert 440 also includes the center wall 450 disposed between the upper and lower walls 446, 448 and extending between the inboard and outboard walls 442, 444 with the center wall 450 having a length less than a length of one or more of the upper and/or lower wall 446, 448. However, in the example shown in FIG. 8, the upper and lower walls 446, 448 are substantially parallel, while the center wall 450 is angled relative to the upper and lower wall 446, 448. As shown in FIG. 8, the first and second legs 456, 462, 458, 464 of the inboard and outboard walls 442, 444 extend similar from the upper and lower walls 446, 448 as described with respect to the tubular insert 440 in FIG. 6, however, the lengths of the first and second legs 456, 462, 458, 464 are adjusted to accommodate the angled center wall 450. The angle of the center wall 450 is approximately 445 degrees in the example shown in FIG. 8, however various other angles have been contemplated including but not limited to angles between 10 and 120 degrees. Additionally, the center wall 450 may be angled in the opposite direction than shown in FIG. 8, such that the portion of the center wall 450 disposed closer to the upper wall 446 is on the outboard side instead of the inboard side as shown in FIG. 8.

Figure 9:
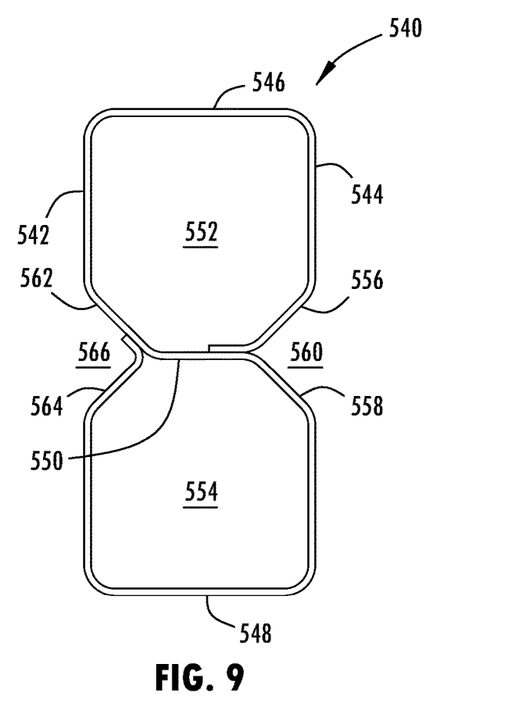
FIG. 9 is a cross-sectional view of another example of the tubular insert.

Referring now to the example shown in FIG. 9, the tubular insert 540 is similar to the tubular insert 540 as described above with respect to FIGS. 3 and 4, including but not limited to the tubular insert 540 including an inboard wall 542 disposed adjacent the sill inner, an outboard wall 544 disposed adjacent the sill outer, an upper wall 546 extending between upper ends of the inboard and outboard walls 542, 544, and a lower wall 548 extending between lower ends of the inboard and outboard walls 542, 544. The tubular insert 540 also includes the center wall 550 disposed between the upper and lower walls 546, 548 and extending between the inboard and outboard walls 542, 544 with the center wall 550 having a length less than a length of one or more of the upper and/or lower wall 546, 548. However, in the example shown in FIG. 9, both the first and second legs 556, 562, 558, 564 of both the inboard and outboard walls 542, 544 extend substantially vertically at an angle of approximately 90 degrees from the upper and lower wall 546, 548, respectively. The first legs and the second legs 556, 562, 558, 564 of both the inboard and outboard walls 542, 544 then protrude inward at an angle of approximately 45 degrees toward the center wall 550. The vertical section of the first and second legs 556, 564, 558, 564 of the inboard and outboard walls 542, 544 have a longer length than described previously above such that the overall height of the tubular insert 540 shown in FIG. 9 may be greater than the height of the tubular insert in previously described examples. This greater height may allow the upper and lower walls 546, 548 to be coupled to the upper and lower walls 528, 534, 530, 536 of the first and second sill members 12, 14 instead of the tubular member being coupled to the sill members at the inboard and outboard walls 542, 544, as described above. Additionally, the configuration illustrated in FIG. 9, allows an even shorter length center wall than described above while still allowing for three load carrying walls in a single direction.

Figure 10:
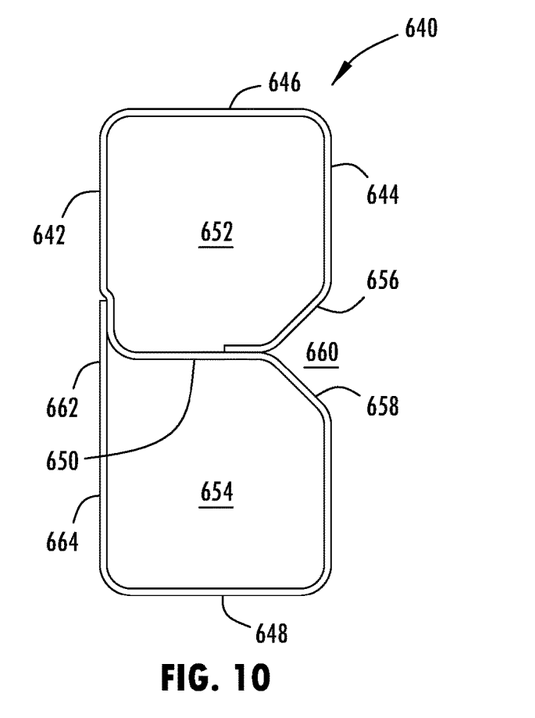
FIG. 10 is a cross-sectional view of another example of the tubular insert.

Referring now to the example shown in FIG. 10, the tubular insert 640 is similar to the tubular insert 640 as described above with respect to FIG. 9, including but not limited to the tubular insert 640 including an inboard wall 642 disposed adjacent the sill inner, an outboard wall 644 disposed adjacent the sill outer, an upper wall 646 extending between upper ends of the inboard and outboard walls 642, 644, and a lower wall 648 extending between lower ends of the inboard and outboard walls 642, 644. The tubular insert 640 also includes the center wall 650 disposed between the upper and lower walls 646, 648 and extending between the inboard and outboard walls 642, 644 with the center wall 650 having a length less than a length of one or more of the upper and/or lower wall 646, 648. However, in the example shown in FIG. 10, the inboard wall 642 extends substantially vertically between the upper wall 646 and the lower wall such 648 that no channel is formed on the inboard side.

The inner and outer sill panels 12, 14 and tubular insert 40 may be roll-formed from an advanced high-strength steel with a tensile strength above 1,000 MPA, such as approximately 1,500 MPa. The metal sheet used to roll form the center wall 50 may be approximately 1.2 mm in thickness, such as between 1.0 mm and 1.6 mm. Also, the steel sheet used for the tubular insert 40 and panels of the vehicle component may be galvanized, so as to have a zinc coating that protects against corrosion. In some examples, however, the steel sheet of the tubular insert may not be galvanized, and in other examples the steel sheets that form the vehicle component may not be galvanized. In further examples, the metal sheet that forms the tubular insert is an aluminum sheet. The length of the inner sill panel 12 is substantially equal to a length of the outer sill panel 14. In additional implementations, the length of the inner sill panel 12 may be shorter than the length of the hollow interior space of the corresponding component, such as between 40% and 100%, between 30% and 90%, or between 30% and 60% of the length of the tubular insert. The sill inner 12 and sill outer 14 may be coupled by welding, using fasteners, adhesive, or another coupling method. The coupling of the tubular insert 40 and one of the sill inner 12 and the sill outer 14 may provide additional strength to the vehicle rocker assembly.

Although the tubular insert 40 may have a structure that provides sufficient stiffness and strength, it is contemplated that the vehicle component may include one or more bulkhead members that are disposed generally orthogonally relative to the longitudinal extent of the rocker component. For example, when the outer rocker panel is desired to be further stiffened, such as for protecting battery modules disposed in a tray between rocker assembles, a series of bulkhead members may be disposed at spaced intervals along the hollow interior between an outer wall section of the tubular insert and an outer panel of a rocker component. The bulkhead members may connect to the outer panel and/or tubular insert with a mechanical fastener, welding, adhesive, or any combination thereof. Moreover, it is contemplated that the inner and outer sill panels may include wall stiffeners that may be attached at select locations of the inner and outer panels. For example, the wall stiffeners may be attached at and reinforce the rounded corners of the metal sheets that form the inner and outer panels. It is contemplated that additional or alternative attachment locations may be used in other examples.

It is also contemplated that the internal reinforcements of the disclosed vehicle rocker assembly may be incorporated in other types of structural beams, such as in frames and structures of automotive and marine vehicles, buildings, storage tanks, furniture, and the like. With respect to vehicle applications, the vehicle component disclosed herein may be incorporated with various applications of different structural components. The vehicle component may be designed to support and sustain different loading conditions, such as for supporting certain horizontal spans or axial loading conditions. Also, the vehicle component may be designed to undergo various impact forces, such as for the illustrated rocker assemblies, pillar structures, and the like. The cross-sectional geometry, material type selections, and material thickness within the cross-sectional profile of the vehicle component may be configured for such a particular use and the desired loading and performance characteristics, such as the weight, load capacity the beam, force deflection performance, and impact performance of the vehicle component.

For purposes of this disclosure, the articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Furthermore, the terms "first," "second," and the like, as used herein do not denote any order, quantity, or importance, but rather are used to denote element from another.

Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. For example, the terms "approximately," "about," and "substantially" may refer to an amount that is within less than 5% of, within less than 1% of, within less than 0.1% of, and within less than 0.01% of a stated amount.

Further, it should be understood that any directions or reference frames in the preceding description are merely relative directions or movements. For example, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle rocker assembly comprising:
a sill inner;
a sill outer coupled with the sill inner to define an elongated hollow interior between the sill inner and the sill outer; and
a tubular insert disposed within the elongated hollow interior, the tubular insert being formed by roll forming a metal sheet, the tubular insert comprising:
an inboard wall disposed adjacent the sill inner;
an outboard wall disposed adjacent the sill outer;
an upper wall extending between upper ends of the inboard and outboard walls;
a lower wall extending between lower ends of the inboard and outboard walls; and
a center wall disposed between the upper and lower walls and extending between the inboard and outboard walls with a length less than the upper and lower walls.

2. The vehicle rocker assembly of claim 1, wherein the outboard wall includes a channel that protrudes inboard into the tubular insert.

3. The vehicle rocker assembly of claim 2, wherein the channel comprises a V-shape.

4. The vehicle rocker assembly of claim 1, wherein the outboard wall includes a first leg and a second leg that protrude inboard from the sill outer to interconnect with the center wall.

5. The vehicle rocker assembly of claim 1, wherein the upper and lower walls are substantially parallel, and wherein the center wall is angled relative to the upper and lower walls.

6. The vehicle rocker assembly of claim 1, wherein the inboard wall includes a channel that protrudes outboard into the tubular insert.

7. The vehicle rocker assembly of claim 6, wherein the channel comprises a U-shape.

8. The vehicle rocker assembly of claim 1, wherein the inboard wall includes a first leg and a second leg that protrude outboard from the sill inner to interconnect with the center wall.

9. A tubular insert for a vehicle rocker assembly having a sill inner including upper and lower flanges and a sill outer including upper and lower flanges, the tubular insert comprising:
an inboard wall disposed adjacent the sill inner;
an outboard wall disposed adjacent the sill outer;
an upper wall extending between upper ends of the inboard and outboard walls;
a lower wall extending between lower ends of the inboard and outboard walls; and
a center wall disposed between the upper and lower walls and extending between the inboard and outboard walls with a length less than the upper and lower walls,
wherein the tubular insert is formed from a single metal sheet by roll forming the single metal sheet.

10. The tubular insert of claim 9, wherein the outboard wall includes a channel that protrudes inboard into the tubular insert.

11. The tubular insert of claim 10, wherein the channel comprises a V-shape.

12. The tubular insert of claim 9, wherein the outboard wall includes a first leg and a second leg that protrude inboard from the sill outer to interconnect with the center wall.

13. The tubular insert of claim 9, wherein the upper and lower walls are substantially parallel, and wherein the center wall is angled relative to the upper and lower walls.

14. The tubular insert of claim 9, wherein the inboard wall includes a channel that protrudes outboard into the tubular insert.

15. The tubular insert of claim 14, wherein the channel comprises a U-shape.

16. The tubular insert of claim 9, wherein the inboard wall includes a first leg and a second leg that protrude outboard from the sill inner to interconnect with the center wall.

17. A tubular insert for a vehicle rocker assembly, the tubular insert comprising:
- an inboard wall configured to be disposed adjacent a sill inner;
- an outboard wall configured to be disposed adjacent a sill outer;
- an upper wall extending between upper ends of the inboard and outboard walls;
- a lower wall extending between lower ends of the inboard and outboard walls; and
- a center wall disposed between the upper and lower walls and extending between the inboard and outboard walls with a length less than the upper and lower walls,
- wherein the outboard wall includes a first leg and a second leg that protrude inboard from the sill outer to interconnect with the center wall, and
- wherein the inboard wall, the outboard wall, the upper wall, the lower wall, and the center wall are integrally formed from a single metal sheet by roll forming the single metal sheet.

18. The tubular insert of claim 17, wherein the outboard wall includes a channel that protrudes inboard into the tubular insert.

19. The tubular insert of claim 17, wherein the upper and lower walls are substantially parallel, and wherein the center wall is angled relative to the upper and lower walls.

* * * * *